(12) United States Patent
Itsukaichi

(10) Patent No.: US 7,545,406 B2
(45) Date of Patent: Jun. 9, 2009

(54) PRINTER FOR DIRECTLY LOADING IMAGE DATA AND PRINTING SYSTEM FOR THE SAME

(75) Inventor: Masakatsu Itsukaichi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 692 days.

(21) Appl. No.: 10/916,541

(22) Filed: Aug. 12, 2004

(65) Prior Publication Data

US 2005/0052689 A1 Mar. 10, 2005

(30) Foreign Application Priority Data

Aug. 15, 2003 (JP) ............................. 2003-293715

(51) Int. Cl.
*H04N 5/225* (2006.01)
(52) U.S. Cl. .................................. 348/207.2
(58) Field of Classification Search .............. 348/207.2; 358/1.15, 1.14
See application file for complete search history.

(56) References Cited

U.S. PATENT DOCUMENTS

| | | | | |
|---|---|---|---|---|
| 5,243,149 A * | 9/1993 | Comerford et al. | ....... | 178/18.03 |
| 5,802,260 A * | 9/1998 | Shimakawa et al. | ........ | 358/1.15 |
| 5,999,600 A * | 12/1999 | Shin | ....................... | 379/100.06 |
| 6,111,605 A * | 8/2000 | Suzuki | ..................... | 348/220.1 |
| 6,288,792 B1 | 9/2001 | Yoshida et al. | | |
| 6,388,757 B1 * | 5/2002 | Koga | ......................... | 358/1.11 |
| 6,552,743 B1 * | 4/2003 | Rissman | ................... | 348/207.2 |
| 6,603,506 B2 * | 8/2003 | Ogawa et al. | ............ | 348/207.2 |
| 6,650,437 B1 * | 11/2003 | Nakajima | .................... | 358/1.9 |
| 6,652,169 B2 * | 11/2003 | Parry | ............................ | 400/74 |
| RE38,759 E * | 7/2005 | Suzuki | .................... | 348/220.1 |
| 7,042,496 B2 * | 5/2006 | Sato | ........................ | 348/207.2 |
| 7,143,291 B1 * | 11/2006 | Shibata | ........................ | 713/182 |
| 7,158,171 B1 * | 1/2007 | Ichihara | ................... | 348/207.2 |
| 7,190,473 B1 * | 3/2007 | Cook et al. | ................ | 358/1.15 |
| 7,298,505 B2 * | 11/2007 | Ueda | ......................... | 358/1.14 |
| 7,304,664 B2 * | 12/2007 | Kawade | ................... | 348/207.2 |
| 2001/0017652 A1 | 8/2001 | Sato | | |
| 2002/0054345 A1 * | 5/2002 | Tomida et al. | ............. | 358/1.15 |
| 2004/0041913 A1 * | 3/2004 | Takasumi et al. | ........ | 348/207.2 |
| 2004/0189811 A1 * | 9/2004 | Ishiyama et al. | .......... | 348/207.2 |
| 2004/0203376 A1 * | 10/2004 | Phillipps | .................... | 455/41.2 |

FOREIGN PATENT DOCUMENTS

JP 11-088815 A 3/1999

* cited by examiner

*Primary Examiner*—Tuan V Ho
*Assistant Examiner*—Kent Wang
(74) *Attorney, Agent, or Firm*—Birch, Stewart, Kolasch & Birch, LLP

(57) ABSTRACT

A printer and a digital camera are respectively provided with a radio interface. The printer loads identification information of the digital camera upon receiving radio transmission of the digital camera. The printer checks the identification information with communication admission information stored in advance. When the identification information is coincident with the communication admission information, the printer automatically changes a normal print mode to a radio communication mode. After that, the printer directly loads image data stored in a memory card of the digital camera to perform printing out thereof.

17 Claims, 3 Drawing Sheets

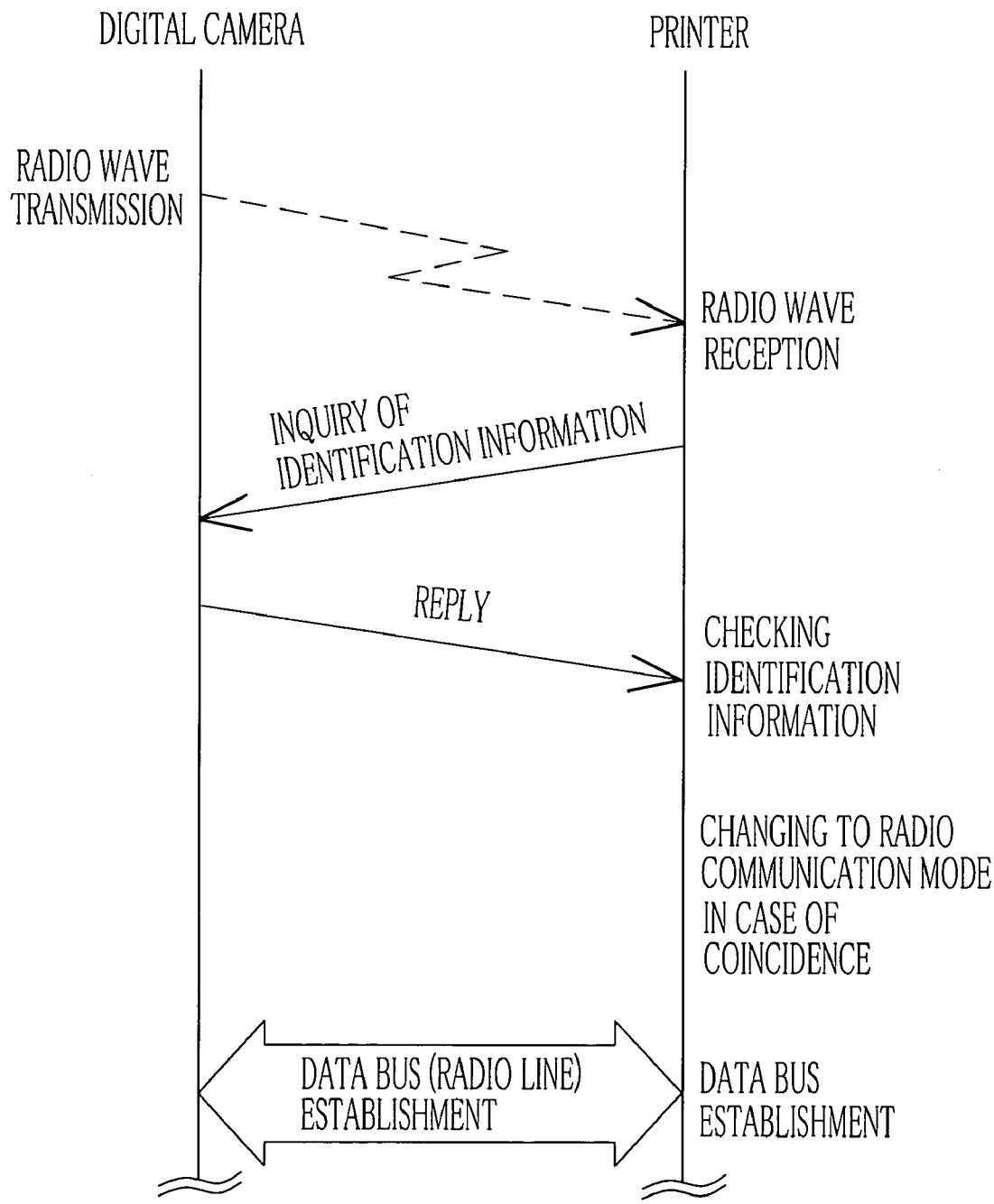

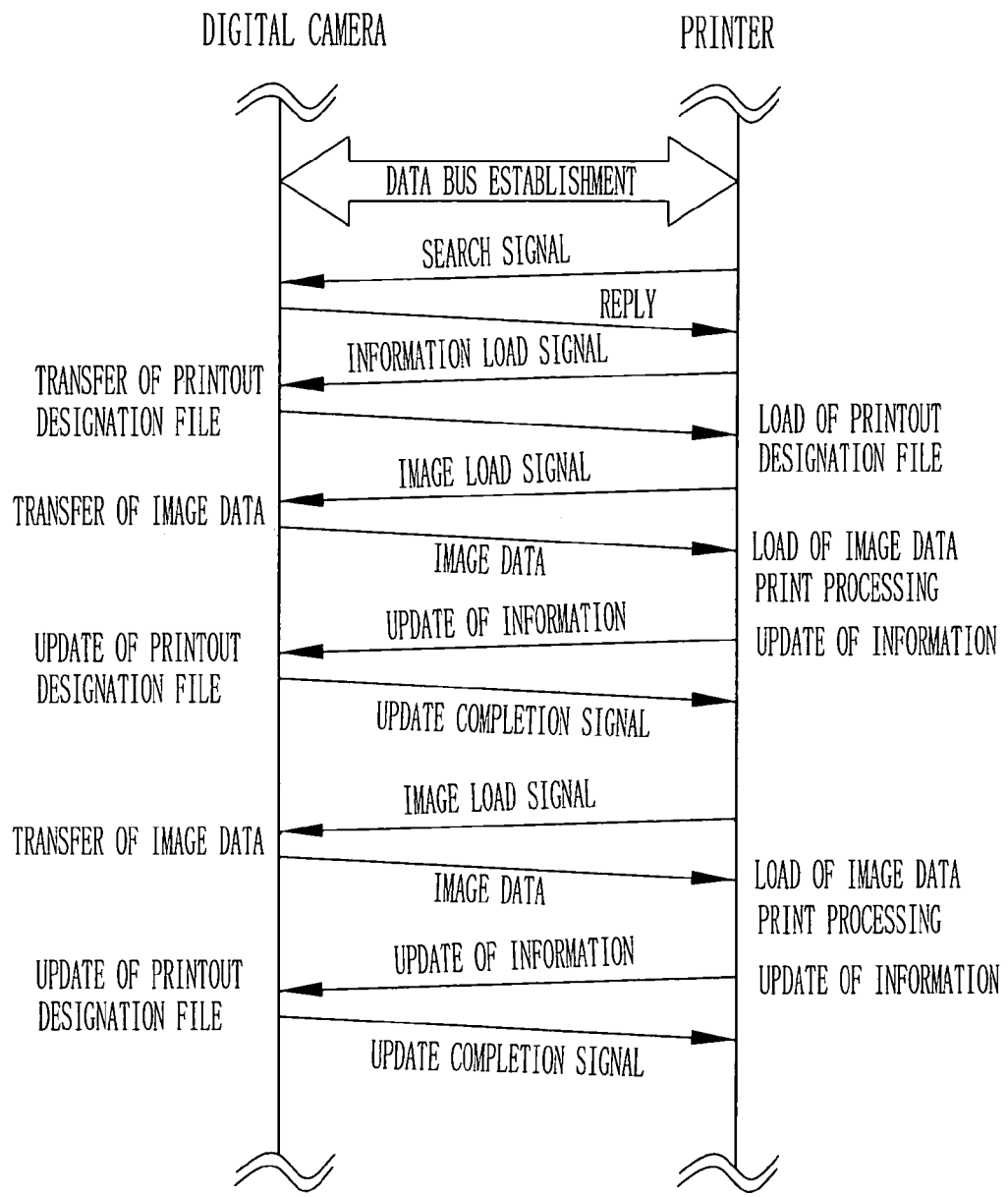

PRINTER FOR DIRECTLY LOADING IMAGE DATA AND PRINTING SYSTEM FOR THE SAME

This Nonprovisional application claims priority under 35 U.S.C. § 119(a) on Patent Application No(s). 2003-293715 filed in JAPAN on Aug. 15, 2003, the entire contents of which are hereby incorporated by reference.

BACKGROUND OF THE INVENTION

1. Field of the Invention

The present invention relates to a printer for directly loading image data stored in a digital camera (electronic camera), and further relates to a printing system for using this printer.

2. Description of the Related Art

A digital camera for recording a taken image in a memory card is known. The taken image is recorded as digital data. The memory card is used for recording the data at the time of photographing, since a data-writing speed is fast. However, a price per unit memory capacity is high. Meanwhile, when an image taken by the digital camera is printed by an external printer, there are some methods, in one of which the taken image data is inputted into the printer via the memory card, and in the other of which the taken image data is inputted into the printer via a personal computer. However, when the taken image data is transferred via the memory card and the personal computer, it is troublesome to set the memory card and to connect the digital camera to the personal computer. In view of this, a printing system in which the digital camera is directly connected to the external printer is provided. In this printing system, the taken image data is directly transferred to the external printer to perform printing. Another printing system using a communication interface and a radio interface is also provided (see Japanese Patent Laid-Open Publication No. 11-88815).

However, with respect to the image data recorded in the digital cameras of different models and of different manufactures, formats thereof are different. Moreover, image processing methods at the time of photographing are also different. Therefore, an error is likely to be caused while printing is performed, and it is likely to cause a defect that color and density of the image become different as a result. In the meantime, the printer is generally connected to the personal computer with a wire interface and is set in a mode for waiting a print instruction from the personal computer. Thus, when the data is transferred from the digital camera via a radio interface, an operation for changing the mode of the printer is required each time so that an advantage of radio communication becomes impaired.

SUMMARY OF THE INVENTION

In view of the foregoing, it is a primary object of the present invention to provide a printer and a printing system in which image data is surely and easily transferred from a digital camera to a printer.

In order to achieve the above and other objects, the printer according to the present invention comprises a radio interface for performing data transfer with the digital camera. The printer further comprises a controller for controlling an operation of the printer. The controller has a check function and a radio-communication-mode function. The check function checks identification information, which has been received from the digital camera via the radio interface, with preset communication admission information. The radio-communication-mode function sets a communication mode when the identification information is coincident with the admission information. Under the communication mode, the image data from the digital camera is directly loaded into the printer via the radio interface.

In the printing system according to the present invention, the digital camera is provided with a first radio interface, and the printer is provided with a second radio interface. Data transfer is performed between the first and second radio interfaces. The printing system further comprises a controller provided in the printer. The controller has a check function and a radio-communication-mode function. The check function checks identification information, which has been received from the digital camera via the second radio interface, with preset communication admission information. The radio-communication-mode function sets a communication mode when the identification information is coincident with the admission information. Under the communication mode, the image data from the digital camera is directly loaded into the printer via the first and second radio interfaces.

According to the present invention, the radio interface for connection is provided so as to directly transfer the data from the digital camera to the printer. Thus, it is possible to load the image data into the printer without ejecting a memory card from the digital camera. Further, the identification information is checked before establishing a data bus of radio communication to judge whether connection is admitted or not. Thus, it is possible to surely prevent a trouble in that printing error is caused by receiving image data having a different format. Furthermore, since the radio communication mode is automatically set in response to admission of connection, it is possible to easily use the printer.

BRIEF DESCRIPTION OF THE DRAWINGS

The above objects and advantages of the present invention will become apparent from the following detailed description of the preferred embodiments of the invention when read in conjunction with the accompanying drawings, in which:

FIG. 2 is a chart explaining a sequence for establishing a data bus; and

FIG. 3 is a chart explaining a sequence executed after establishing the data bus.

DETAILED DESCRIPTION OF THE PREFERRED EMBODIMENT(S)

Figure 1:
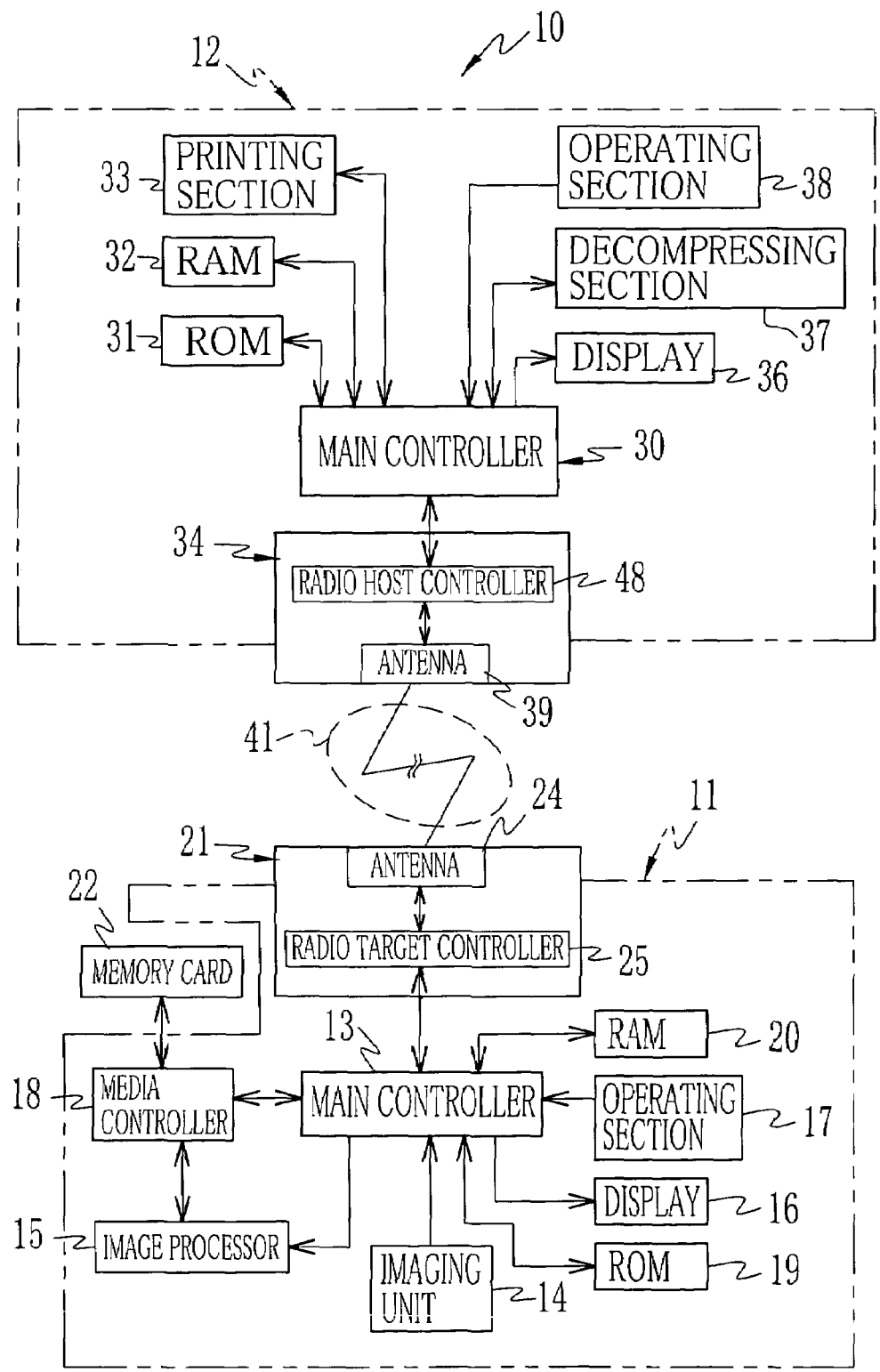
FIG. 1 is a block diagram showing electric structures of a printer and a digital camera.

As shown in FIG. 1, a print system 10 is constituted of a digital camera 11 and a printer 12, which are directly connected. The digital camera 11 comprises a main controller 13, an imaging unit 14, an image processor 15, a display 16, an operating section 17, a media controller 18, a ROM 19, a RAM 20 and a radio target interface 21. The imaging unit 14 comprises a photographic optical system, a CCD image sensor, an A-D converter and so forth. The imaging unit 14 converts an image, which has been obtained by photographing a subject, into digital data to be outputted.

The image processor 15 performs various kinds of image processing for the digitized image data. The various kinds of the image processing include decompression/compression processing, for instance. The media controller 18 accesses the memory card 22 to write and read the image data. The radio interface 21 performs radio communication with the printer, and includes a target controller 25 and an antenna 24 for sending and receiving electric waves. The main controller 13 integrally controls the above-mentioned sections of the digital camera 11 in accordance with an operation signal outputted from the operating section 17. The memory card 22 is removably attached to the media controller 18.

The digital camera 11 has a photography mode, a replay mode and a direct print mode, which are selected by a switching operation of the operating section 17. Under the photography mode, the image data taken by driving the imaging unit 14 is compressed and recorded in the memory card 22. The replay mode is for showing the image data, which is recorded in the memory card 22, on the display 16. The direct print mode is for transmitting the image data to the printer 12 by radio. The ROM 19 stores in advance identification data (ID), device information, print designation program and so forth.

The print designation program is for producing a printout designation file (print information). The printout designation file is interactively produced such that choice of printout and a desired print number in case of printout are designated from the operating section 17 while sequentially showing the image data recorded in the memory card 22. The printout designation file has an easy text format and is constituted of a header and a job description. In the header, are automatically recorded the device information, a file creation date, the identification data, user information and so forth. The device information concerns a model number and a model name of the camera, and is previously stored in the ROM 19 when the digital camera 11 is manufactured at a factory. The user information is registered by a user when the digital camera 11 is used first. This information is stored in the RAM 20. The identification data is a global number of the digital camera 11, which is respectively different and is previously stored in the ROM 19 at the time of manufacture.

In the job description, automatic print information is described, and marks of the image data (paths including file names) are written in a printing order. The mark of the image data relates to the desired print number and so forth. The printout designation file is recorded in the memory card 22 in another file format differently from the image data.

The printer 12 comprises a main controller 30, a ROM 31, a RAM 32, a printing section 33, a radio host interface 34, a display 36, a decompressing section 37 and an operating section 38. The main controller 30 integrally controls the respective sections of the printer 12. The decompressing section 37 decompresses the loaded image data, which is compressed, to convert it into reproduced image data. The printer has a normal print mode for performing cable communication of the data with the personal computer, and a radio communication mode for performing radio communication of the data with the digital camera 11. The printer is automatically set in the normal print mode upon inputting an external power supply.

When the radio communication is used, it is necessary to place the printer 12 and the digital camera 11 within a communication area 41 defined by an access range of radio waves. Regarding the radio interface, it is possible to adopt an interface utilizing infrared rays, for example, instead of utilizing the radio waves. In the methods utilizing the radio waves and the infrared rays, the interfaces of IEEE802.01, Bluetooth standard and so forth may be employed.

In general, as to the communication interface, there are a peer-to-peer type and a master-slave type. In the peer-to-peer type, communication is controlled in a state that connected two equipments have an equal footing. In the master-slave type, communication is performed in a state that one of the connected two equipments has the initiative and the other depends thereon. In the master-slave type, the master side deals with a major part of the communication control so that a load of the slave side is reduced. Thus, it is possible to simplify a communication-interface structure of the slave side in the master-slave type. The radio interface of this embodiment is of the master-slave type, and equipments to be a master and a slave are respectively called as a radio host and a radio target.

The master-slave-type interface is used as a typical communication interface for connecting a personal computer and a peripheral equipment. Usually, the personal-computer side has a host interface and the peripheral-equipment side has a target interface. The radio interface is provided with the following functions. When the printer 12 is set in a power-saving mode, the printer 12 is automatically changed to the print mode or to the radio communication mode upon receiving the radio waves from the digital camera 11. A data bus (radio transmission channel) is established after checking identification information sent from the digital camera 11 and after confirming that the digital camera 11 is connectable.

Although this kind of the radio interface is included in the digital camera and a conventional printer, it does not have a host function so that such digital camera and printer merely work as a peripheral equipment (target) of a personal computer. It is impossible to connect the target equipments without a host equipment. Thus, it is impossible to transfer the data from the digital camera to the conventional printer by connecting them.

The printer 12 according to the present invention comprises the radio interface having the host function. In virtue of this, it is possible to connect the printer 12 to the digital camera 11, which merely works as the target equipment. Consequently, it is possible to directly transfer an image file of the memory card 22 to the printer 12 in a state that the digital camera 11 is loaded with the memory card 22.

FIG. 2 shows a sequence executed when a radio data bus is established between the printer 12 and the digital camera 11. Upon receiving the radio wave from the digital camera 11, the printer 12 sends an inquiry command to the digital camera 11 to inquire the identification information. The digital camera 11 sends the identification information in response to the inquiry of the printer 12.

Upon reception of the identification information, the printer 12 checks this information with communication admission information, and establishes the data bus in a case of coincidence. In addition, equipment information and specification information of the radio interface are sent besides the identification information. The specification information of the radio interface includes a data transfer rate and so forth. The communication admission information is a connection profile in which the identification information of the camera having admission of communication is described. The printer establishes the data bus only when obtaining the coincidence after checking. At this time, if the printer is set in a standby mode, the printer is automatically changed to an operation mode, and then, the data bus is established. After completing such negotiation, the data bus is established and it becomes possible to transfer the data.

Under the direct print mode, the digital camera 11 works as a media drive for reading and writing the data by accessing the memory card.

After establishing the data bus, the printer 12 executes a printout program in which it is searched first whether or not the media drive of the digital camera 11 includes the printout designation file. When the printout designation file exists, this file is loaded and the image data is transferred in an order designated thereby. Successively, the printing section 33 is instructed to perform printing by times of a designated number. Further, whenever printing is performed, an information update signal is generated to write a print history into the print information. This signal is sent to the digital camera 11.

When establishing the data bus, access is restricted by checking the identification information. Instead of the above identification information, the other identification information optionally inputted by a user may be used. In this case, both of the digital camera 11 and the printer 12 are adapted to store the identification information optionally inputted by the user. For instance, a nonvolatile memory of EEPROM and so forth is used as a memory for the identification information. Before the data bus is established, the identification information is transferred from the digital camera 11 to the printer 12. Successively, the transferred identification information is checked with the identification information stored in the printer. When both of them are coincident, the access is admitted. In contrast, when both of them are not coincident, the access is rejected. The access is restricted this way.

An operation of the above printout program is described below, referring to FIG. 3. The digital camera 11 is set in the direct print mode, and external power is supplied to the printer 12. Under the direct print mode, the digital camera 11 sends the predetermined radio waves in constant cycles. When the digital camera 11 enters the communication area, the printer 12 receives the radio waves from the digital camera 11 and inquires the identification information such as describe above. The digital camera 11 reads the internally stored identification information and sends it to the printer 12. The printer 12 checks the obtained identification information with the identification information described in the communication admission information. When both of them are coincident, the normal print mode is changed to the radio communication mode, and then, the data bus is established. After establishing the data bus, the digital camera 11 is automatically set in a data transfer mode. Moreover, the printer 12 is set in an automatic printout mode.

Upon setting the printer 12 in the printout mode, the printout program is executed. The printer generates a search signal for searching the printout designation file. This search signal is sent to the digital camera 11. After receiving the search signal, the digital camera 11 searches a drive of the memory card 22. When the printout designation file exists, this file is retrieved. Incidentally, when the printout designation file does not exist, the printout program is over.

The printer 12 temporarily stores the retrieved printout designation file in the RAM 32. And then, the printer 12 reads the printout designation file from the RAM 32 and generates an image load signal for sequentially loading the image data designated by the file. This image load signal is sent to the digital camera 11. Thereupon, the image data designated by the printout designation file is sequentially loaded from the digital camera 11 to the printer 12.

The printer 12 temporarily stores the loaded image data in the RAM 32, and decompresses the image data in the decompressing section 37 when reading this data from the RAM 32. After that, printing is performed in the printing section 33. Information concerning a print number specified in the printout designation file is already sent to the printing section 33 so that printing is performed by times of that number.

The printer 12 updates the printout designation file stored in the RAM 32 whenever one print is completed. In this update, the print number of the image data is rewritten so as to subtract the printed number. The rewritten printout designation file is loaded into the digital camera 11 to update the printout designation file thereof. When the remaining print number described in the printout designation file reaches to zero, contents of the current image data is deleted.

Successively, the printer 12 loads the image data in order to perform printing, such as described above. Whenever one print is completed, the printout designation file stored in the digital camera 11 is updated. After carrying out the printing process relative to all of the image data, the printout designation files stored in the RAM 32 and the digital camera 11 are respectively deleted. By doing so, even if establishment of the data bus is disconnected on the way and even if communication error is caused, it is possible to surely prevent a trouble in that the same image is doubly printed at the time of reconnection. Incidentally, the communication error is caused, for example, when a power supply of the printer 12 or the digital camera 11 is turned off.

After all of the images have been printed, the printer 12 searches the printout designation file again. When the printout designation file of the unprinted image does not exist, the printer 12 is automatically changed to the normal print mode.

In the above embodiment, the radio interface 34 of the printer 12 is provided with the host function. However, the radio interface of the digital camera 11 may be provided with the host function. Further, in the above embodiment, the printer 12 and the digital camera 11 have the built-in radio interface. However, it is possible to use another radio interface to be detachably attached to an external interface. In this case, the camera and the printer are provided with a well-known USB interface and an IEEE1394 interface being as the external interface. The radio interface to be used is connected to the external interface.

As to the memory of the digital camera 11 for recording the image, a built-in memory may be used instead of the removable memory card 22.

Meanwhile, instead of the digital camera 11, it is possible to use an image recording device with an imaging function, which has a memory for recording a still image photographed by a user. The image recording device is a digital video camera, a cell phone with a camera, a watch with a camera, and so forth.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A printer for loading image data of a taken image from a memory of a digital camera to print out said image data, said printer comprising:

a radio interface for performing data transfer with said digital camera;

a controller for controlling an operation of said printer, said controller having a check function and a radio-communication-mode function;

said check function checking identification information, which has been received from said digital camera via said radio interface, with preset communication admission information at the printer, said admission information at least identifying digital cameras permitted access to the printer; and said radio-communication-mode function setting a communication mode when said identification information is coincident with said admission information, said image data from said digital camera being directly loaded into said printer via said radio interface under said communication mode, wherein when said identification information is not coincident with said admission information, all printing access to the printer is denied, wherein said identification information is arbitrarily changeable before the data transfer;

wherein when said printer is set in an automatic printout mode, said printer generates a search signal for searching a printout designation file and sends said search signal to said digital camera;

wherein the printer receives a printout designation file from the digital camera and performs printing based on information stored in the printout designation files; and wherein upon receipt of the print designation file, the printer generates an image load signal for sequentially loading the image data designated by the file and transmits the generated signal to the digital camera, wherein the image data designated by the printout designation file is sequentially loaded to the printer.

2. A printer according to claim 1, wherein said radio interface performs communication by using radio waves.

3. A printer according to claim 1, wherein said radio interface performs communication by using infrared rays.

4. A printer according to claim 1, wherein said digital camera has a ROM in which said identification information is stored, said identification information being stored in said ROM at the time of manufacturing.

5. A printer according to claim 1, wherein said memory of said digital camera is a memory card removably attached to said digital camera.

6. A printing system including a digital camera provided with a memory for storing image data of a taken image, and a printer for loading said image data from said memory to perform printing out, said printing system comprising:

a first radio interface provided in said digital camera;

a second radio interface provided in said printer, data being transferred between said first and second radio interfaces;

a controller provided in said printer, said controller having a check function and a radio-communication-mode function;

said check function checking identification information, which has been received from said digital camera via said second radio interface, with preset communication admission information at the printer, said admission information at least identifying digital cameras permitted access to the printer; and said radio-communication-mode function setting a communication mode when said identification information is coincident with said admission information, said image data from said digital camera being loaded into said printer via said first and second radio interfaces under said communication mode, wherein when said identification information is not coincident with said admission information, all printing access to the printer is denied, and wherein said identification information is arbitrarily changeable before the data transfer;

wherein when said printer is set in an automatic printout mode, said printer generates a search signal for searching a printout designation file and sends said search signal to said digital camera;

wherein the printer receives a printout designation file from the digital camera and performs printing based on information stored in the printout designation files; and wherein upon receipt of the print designation file, the printer generates an image load signal for sequentially loading the image data designated by the file and transmits the generated signal to the digital camera, wherein the image data designated by the printout designation file is sequentially loaded to the printer.

7. A printing system according to claim 6, wherein said first and second radio interfaces perform communication by using radio waves.

8. A printing system according to claim 6, wherein said first and second radio interfaces perform communication by using infrared rays.

9. A printing system according to claim 6, wherein said digital camera has a ROM in which said identification information is stored, said identification information being stored in said ROM at the time of manufacturing.

10. A printing system according to claim 6, wherein said memory of said digital camera is a memory card removably attached to said digital camera.

11. The printer of claim 1 wherein the printer updates the received printout designation file whenever one print is completed and, upon updating the printout designation file, the updated printout designation file is transmitted to the digital camera.

12. The printer of claim 6, wherein the digital camera includes a print mode wherein the digital camera sends predetermined radio waves in constant cycles, wherein when the digital camera enters a communication area, the printer receives the radio waves, determines whether the digital camera should be granted access to the printer, and, upon determining that the digital camera should be granted access, the digital camera automatically transmits a printout designation file to the printer.

13. The printer of claim 1, wherein upon determining the digital camera should be granted access, the printer automatically switches from a current mode to a radio communication mode to establish a data bus to receive image data and then automatically switches to an automatic printout mode.

14. A printing system including a digital camera provided with a memory for storing image data of a taken image, and a printer for loading said image data from said memory to perform printing out, said printing system comprising:

a first radio interface provided in said digital camera;

a second radio interface provided in said printer, data being transferred between said first and second radio interfaces;

a controller provided in said digital camera, said controller having a check function and a radio-communication-mode function;

said check function checking identification information, which has been received from said printer via said first radio interface, with preset communication admission information at the digital camera; and said radio-communication-mode function setting a communication mode when said identification information is coincident with said admission information, said image data from said digital camera being loaded into said printer via said first and second radio interfaces under said communication mode, wherein said identification information is arbitrarily changeable before the data transfer;

wherein when said printer is set in an automatic printout mode, said printer generates a search signal for searching a printout designation file and sends said search signal to said digital camera;

wherein the printer receives a printout designation file from the digital camera and performs printing based on information stored in the printout designation files; and wherein upon receipt of the print designation file, the printer generates an image load signal for sequentially loading the image data designated by the file and transmits the generated signal to the digital camera, wherein the image data designated by the printout designation file is sequentially loaded to the printer.

15. The printer of claim 1, wherein the radio interface is a host radio interface that automatically changes to the radio communication mode upon receiving a signal from the digital camera.

16. The system of claim 14, wherein the digital camera includes a print mode wherein the digital camera sends predetermined radio waves in constant cycles, wherein when the digital camera enters a communication area, the printer receives that radio waves, determines whether the digital camera should be granted access to the printer, and, upon determining that the digital camera should be granted access, the digital camera automatically transmits a printout designation file to the printer.

17. The printer of claim 11, wherein the printer searches the printout designation file again after all of images are printed, and the printer is automatically changed to a normal print mode when the printout designation file of an unprinted image does not exist.

* * * * *